(12) United States Patent
Hou et al.

(10) Patent No.: US 12,401,414 B2
(45) Date of Patent: Aug. 26, 2025

(54) METHOD FOR HANDOVER OF SATELLITE BASE STATION, TERMINAL, SATELLITE BASE STATION, AND STORAGE MEDIUM (71) Applicant: DATANG MOBILE COMMUNICATIONS EQUIPMENT CO., LTD., Beijing (CN)

(72) Inventors: Liming Hou, Beijing (CN); Shaoli Kang, Beijing (CN); Deshan Miao, Beijing (CN); Bo Han, Beijing (CN); Shiqiang Suo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 579 days.

(21) Appl. No.: 17/787,930

(22) PCT Filed: Nov. 24, 2020

(86) PCT No.: PCT/CN2020/131221
§ 371 (c)(1),
(2) Date: Jun. 21, 2022

(87) PCT Pub. No.: WO2021/135735
PCT Pub. Date: Jul. 8, 2021

(65) Prior Publication Data
US 2023/0045249 A1 Feb. 9, 2023

(30) Foreign Application Priority Data
Jan. 3, 2020 (CN) .......................... 202010005112.1

(51) Int. Cl.
*H04B 7/185* (2006.01)
*H04W 36/00* (2009.01)
(Continued)

(52) U.S. Cl.
CPC .... *H04B 7/18519* (2013.01); *H04W 36/0055* (2013.01); *H04W 36/083* (2023.05); *H04W 36/328* (2023.05)

(58) Field of Classification Search
CPC ............ H04B 7/18519; H04W 36/083; H04W 36/328; H04W 36/0055
(Continued)

(56) References Cited

U.S. PATENT DOCUMENTS 6,246,874 B1 * 6/2001 Voce ................. H04B 7/18541
455/13.1
10,872,348 B1 * 12/2020 Allen ..................... H04N 23/90
(Continued)

FOREIGN PATENT DOCUMENTS

CN 105281958 A 1/2016
CN 105682163 A 6/2016
(Continued)

OTHER PUBLICATIONS

3GPP, "Solutions for NR to support non-terrestrial networks (NTN)," 3GPP TR 38.821 V1.0.0, Technical Specification Group Radio Access Network, Dec. 2019, Release 16, total 143 pages.

*Primary Examiner* — Nuzhat Pervin
(74) *Attorney, Agent, or Firm* — KILPATRICK TOWNSEND & STOCKTON LLP (57) ABSTRACT A method for handover of a satellite base station, a terminal, the satellite base station, and a storage medium are provided. The terminal determines a pitch angle when accessing the satellite base station; and if the pitch angle is determined within a preset range, the terminal performs inter-satellite handover; or the terminal sends the pitch angle to the accessed satellite base station, so that the satellite base (Continued)

station notifies the terminal to perform the inter-satellite handover when determining that the pitch angle is within the preset range.

8 Claims, 6 Drawing Sheets

(51) Int. Cl.
*H04W 36/08* (2009.01)
*H04W 36/32* (2009.01)

(58) Field of Classification Search
USPC ......................................................... 342/358
See application file for complete search history.

(56) References Cited

U.S. PATENT DOCUMENTS

| | | | |
|---|---|---|---|
| 11,082,903 B2 * | 8/2021 | Yun | H04B 7/18541 |
| 11,917,572 B2 * | 2/2024 | Miao | H04B 7/1853 |
| 11,968,640 B2 * | 4/2024 | Xu | H04W 56/0035 |
| 2012/0149378 A1 * | 6/2012 | Li | H04W 36/00837 |
| | | | 455/438 |
| 2016/0127961 A1 * | 5/2016 | Wang | H04W 36/0061 |
| | | | 370/331 |
| 2020/0178135 A1 * | 6/2020 | Yun | H04W 36/0061 |
| 2021/0045027 A1 * | 2/2021 | Hong | H04W 36/08 |
| 2021/0242934 A1 * | 8/2021 | Qiao | H04W 72/12 |
| 2021/0283972 A1 * | 9/2021 | Coerman | B60G 17/018 |
| 2022/0069902 A1 * | 3/2022 | Fan | H04W 36/38 |
| 2022/0159526 A1 * | 5/2022 | Zhang | H04W 36/0077 |
| 2022/0217607 A1 * | 7/2022 | Lin | G01S 19/256 |
| 2023/0132643 A1 * | 5/2023 | Valentin | B65G 69/005 |
| | | | 414/401 |

FOREIGN PATENT DOCUMENTS

| | | | | |
|---|---|---|---|---|
| CN | 106792946 A | | 5/2017 | |
| CN | 109309522 A | | 2/2019 | |
| CN | 110572200 A | | 12/2019 | |
| CN | 111385013 B | * | 12/2021 | ........... H04B 7/1851 |
| EP | 0575678 A1 | | 12/1993 | |
| EP | 3326301 B1 | * | 3/2020 | ............... H04B 7/02 |
| WO | WO-9956408 A1 | * | 11/1999 | ......... H04B 7/18541 |
| WO | WO-2019170866 A1 | * | 9/2019 | ......... H04B 7/18504 |

* cited by examiner

METHOD FOR HANDOVER OF SATELLITE BASE STATION, TERMINAL, SATELLITE BASE STATION, AND STORAGE MEDIUM

CROSS-REFERENCE OF RELATED APPLICATIONS

The disclosure is a US National Stage of International Application No. PCT/CN2020/131221, filed on Nov. 24, 2020, which claims priority to Chinese Patent Application No. 202010005112.1, filed with the China National Intellectual Property Administration on Jan. 3, 2020 and entitled "Handover Method for Satellite Base Station, Terminal, Satellite Base Station, and Storage Medium", which is hereby incorporated by reference in its entirety.

FIELD

The disclosure relates to the field of satellite communications, and particularly to a handover method for a satellite base station, a terminal, a satellite base station and a storage medium.

BACKGROUND

In order to achieve global coverage, a low-orbit satellite communication system generally requires a large number of satellites to form a constellation, and the entire constellation system provides services for users. Due to the low orbit and fast operation of satellites, and for satellites with an orbital altitude of about 1000 km, an earth terminal can see the satellites at the same position on the earth for about 10 minutes. In order to maintain uninterrupted services, frequent handover among satellites is required on the ground.

Since both satellites and terminals operate in high frequency bands, antenna beams of the satellites and terminals have strong directivity. The ground terminal has narrow antenna beams. When accessing a satellite cell or switching between different satellites, a relationship between the terminal's beam directivity and the satellite's position needs to be considered.

Reference information of the existing satellite base station handover is generally a decision based on received signal strength. The terminal obtains RSSIs (Received Signal Strength Indicators) of the current cell and neighboring cells through RRM (Radio Resource Management) measurement, and determines whether to perform cell handover by comparing the RSSIs of cells. The premise of the implementation of this method is that the terminal can obtain downlink signals of cells at the same time, which is difficult and costly to implement; and for the satellite broadband communication operating in a high frequency band, due to the long propagation path and concentrated beam coverage, the received signal strength of the terminal in the coverage area is low and has a small change, so it is difficult to meet the application requirements of the satellite base station handover in the low-orbit satellite broadband communication system only by detecting the change of the cell signal strength.

SUMMARY

The disclosure relates to the field of satellite communications, and particularly to a handover method for a satellite base station, a terminal, a satellite base station and a storage medium, to solve the problem that the current method for satellite base station handover is not accurate enough.

Based on the foregoing problem, in one embodiment of the disclosure provides a handover method for satellite base station, including: determining, by a terminal, a pitch angle when accessing the satellite base station; performing, by the terminal, an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, determining, by the terminal, the pitch angle when accessing the satellite base station, includes: taking, by the terminal, a measured included angle between a beam direction used when an antenna works and a ground horizontal line as the pitch angle; or receiving, by the terminal, indication information sent by the accessed satellite base station, and determining the pitch angle according to the indication information.

In one embodiment, before the terminal determines the pitch angle when accessing the satellite base station, the method further includes: determining, by the terminal, that a duration between time when a previous inter-satellite handover was performed and current time reaches a preset handover maintenance duration.

In one embodiment of the disclosure provides a handover method for a satellite base station, including: determining, by a terminal, a pitch angle when accessing the satellite base station; sending, by the terminal, the pitch angle to the accessed satellite base station, and the satellite base station notifies the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, determining, by the terminal, the pitch angle when accessing the satellite base station, includes: taking, by the terminal, a measured included angle between a beam direction used when an antenna works and a ground horizontal line as the pitch angle; or receiving, by the terminal, indication information sent by the accessed satellite base station, and determining the pitch angle according to the indication information.

In one embodiment, before the terminal determines the pitch angle when accessing the satellite base station, the method further includes: determining, by the terminal, that a duration between time when a previous inter-satellite handover was performed and current time reaches a preset handover maintenance duration.

In one embodiment of the disclosure provides a handover method for a satellite base station, including: receiving, by the satellite base station, a pitch angle sent by a terminal; where the pitch angle is a pitch angle when the terminal accesses the satellite base station; notifying, by the satellite base station, the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, before the satellite base station receives the pitch angle sent by the accessed terminal, the method further includes: sending, by the satellite base station, indication information to the terminal, and the terminal determines the pitch angle according to the indication information.

In one embodiment of the disclosure provides a terminal, including a processor, a memory, and a transceiver; where the processor is configured to read programs in the memory to: determine a pitch angle when accessing a satellite base station; perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the processor is configured to: take a measured included angle between a beam direction used when an antenna works and a ground horizontal line as the pitch angle; or receive indication information sent by the accessed satellite base station, and determine the pitch angle according to the indication information.

In one embodiment, the processor is further configured to: determine that a duration between time when a previous inter-satellite handover was performed and current time reaches a preset handover maintenance duration before determining the pitch angle when accessing the satellite base station.

In one embodiment of the disclosure provides a terminal, including a processor, a memory and a transceiver; where the processor is configured to read programs in the memory to: determine a pitch angle when accessing a satellite base station; send the pitch angle to the accessed satellite base station, and the satellite base station notifies the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the processor is configured to: take a measured included angle between a beam direction used when an antenna works and a ground horizontal line as the pitch angle; or receive indication information sent by the accessed satellite base station, and determine the pitch angle according to the indication information.

In one embodiment, the processor is further configured to: determine that a duration between time when a previous inter-satellite handover was performed and current time reaches a preset handover maintenance duration before determining the pitch angle when accessing the satellite base station.

In one embodiment of the disclosure provides a satellite base station, including a processor, a memory, and a transceiver; where the processor is configured to read programs in the memory to: receive a pitch angle sent by a terminal; where the pitch angle is a pitch angle when the terminal accesses the satellite base station; notify the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the processor is further configured to: send indication information to the terminal, and the terminal determines the pitch angle according to the indication information.

In one embodiment of the disclosure provides a terminal, including: a first determining device configured to determine a pitch angle when accessing a satellite base station; a triggering device configured to perform an inter-satellite handover when determining that the pitch angle is within a preset range.

In one embodiment of the disclosure provides a terminal, including: a second determining device configured to determine a pitch angle when accessing a satellite base station; a sending device configured to send the pitch angle to the accessed satellite base station, and the satellite base station notifies the terminal to perform an inter-satellite handover when determining that the pitch angle is within a preset range.

A one embodiment of the disclosure provides a satellite base station, including: a receiving device configured to receive a pitch angle sent by a terminal; where the pitch angle is a pitch angle when the terminal accesses the satellite base station; a notification device configured to notify the terminal to perform an inter-satellite handover when determining that the pitch angle is within a preset range.

In one embodiment of the disclosure provides a storage medium storing a processor-readable program thereon, where the program implements the steps of the method described in the embodiments when executed by a processor.

In embodiments of the disclosure, the terminal or the satellite base station can determine whether to perform a handover of the accessed satellite base station according to the pitch angle and the preset range, while the pitch angle parameter is easy to obtain without additional calculation of other reference information. This can be realized on the basis of normal operations of the current satellite and terminal, and the system implementation is simple; and the occasion when the terminal needs to perform the satellite base station handover can be accurately determined according to the preset range, to realize the fast and accurate satellite base station handover and improving the decision efficiency of the satellite base station handover.

DETAILED DESCRIPTION OF EMBODIMENTS

Embodiments of the disclosure will be described clearly and completely with reference to the accompanying drawings.

It should be noted that terms and "first", "second" and the like in the specification and claims of the disclosure and the above drawings are used to distinguish similar objects, but not necessarily to describe a particular order or sequence. It should be understood that data used in this way is interchangeable under appropriate circumstances, and embodiments of the disclosure described herein can be implemented in an order other than those illustrated or described herein. Implementations described in embodiments do not represent all the implementations consistent with the disclosure. On the contrary, the implementations are only examples of apparatuses and methods which are detailed in the attached claims and consistent with some embodiments of the disclosure.

Some terms that appear herein will be explained below.

1. The term "and/or" in embodiments of the disclosure describes an association relationship of associated objects, indicating that there may be three relationships, for example, A and/or B may represent: only A, both A and B, and only B. The character "/" generally indicates that the associated objects have a kind of "or" relationship.

2. The term "antenna beam" in embodiments of the disclosure is the main lobe of the antenna pattern, where the distribution of the radio wave energy radiated by the antenna in the spatial direction is generally uneven, which is reflected in the directivity of the antenna. In addition to the main lobe (main beam), there are generally side lobes and back lobes in the antenna pattern. The antenna beam generally refers to the main lobe or main beam, which is an area where the antenna energy is most concentrated.

3. The term "satellite" in embodiments of the disclosure is an artificial satellite, and is built by humans and launched into space by a space flight vehicle and a rocket or a space shuttle, and orbits the earth or other planets like natural satellites.

4. The term "pitch angle" in embodiments of the disclosure is an included angle between a beam pointing direction and a ground horizontal direction when a terminal's antenna works.

5. The term "LEO" in embodiments of the disclosure is an abbreviation of Low Earth Orbit, which refers to a near-earth orbit and refers to an orbit in which a spacecraft is at a lower height from the ground. There is no generally-accepted strict definition of low earth orbit. Generally, the near-circular orbit with an orbital altitude of less than 2000 kilometers can be called low earth orbit. Since the satellites with low earth orbit are closer to the ground, most of earth observation satellites, geodesic satellites, space stations, and some new communication satellite systems use the low earth orbit.

Network architectures and service scenarios described in embodiments of the disclosure are intended to illustrate embodiments of the disclosure more clearly, and do not constitute a limitation on the embodiments of the disclosure. With the evolution of network architectures and the emergence of new service scenarios, embodiments of the disclosure are also applicable to similar problems.

Embodiments of the disclosure clearer, the disclosure will be further illustrated below in details with reference to the accompanying drawings. Obviously the described embodiments are merely a part of embodiments of the disclosure but not all embodiments.

The disclosure will be described below in detail with reference to the drawings.

Figure 1:
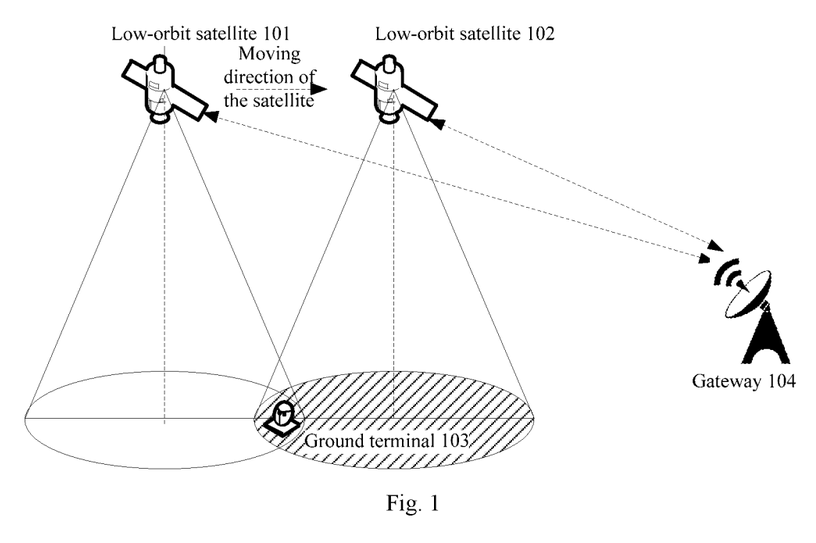
FIG. 1 is an architecture schematic diagram of a handover system for a satellite base station according to an embodiment of the disclosure.

FIG. 1 shows an architecture schematic diagram of a system applicable to embodiments of the disclosure. As shown in FIG. 1, a large number of satellites are required to form a constellation in the LEO (Low Earth Orbit) satellite communication system, and the entire constellation provides services for users. FIG. 1 shows a low-orbit satellite 101 and a low-orbit satellite 102 in a low-orbit satellite communication system. A ground terminal 103 communicates with a gateway 104 through the satellites in the low-orbit satellite system.

FIG. 1 shows the process of the ground terminal 103 switching between the low-orbit satellite 101 and the low-orbit satellite 102. The satellite currently accessed by the ground terminal 103 is the low-orbit satellite 101. Due to the low orbit and fast operation of satellites, and for satellites with an orbital altitude of about 1000 km, the earth terminal can see the satellites at the same position on the earth for about 10 minutes. In order to maintain uninterrupted services, the ground terminal needs to switch from the low-orbit satellite 101 to the low-orbit satellite 102.

The reference information of the existing satellite base station handover is generally a decision based on the received signal strength. The terminal obtains the RSSIs (Received Signal Strength Indicators) of the current cell and neighboring cells through RRM (Radio Resource Management) measurement, and determines whether to perform cell handover by comparing the RSSIs of cells. The premise of the implementation of this method is that the terminal can obtain the downlink signals of cells at the same time, which is difficult and costly to implement; and for the satellite broadband communication operating in a high frequency band, due to the long propagation path and concentrated beam coverage, the received signal strength of the terminal in the coverage area is low and has a small change, so it is difficult to meet the application requirements of the satellite base station handover in the low-orbit satellite broadband communication system only by detecting the change of the cell signal strength.

Figure 2:
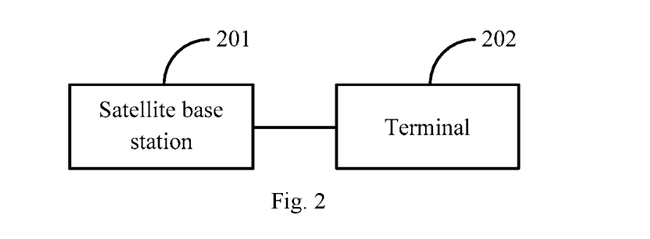
FIG. 2 is a schematic diagram of a handover system for a satellite base station according to an embodiment of the disclosure.

Based on the above problems, the disclosure provides a handover system for a satellite base station, as shown in FIG. 2, including a satellite base station 201 and a terminal 202. The terminal 202 determines a pitch angle when accessing the current satellite base station 201, and the terminal 202 performs the inter-satellite handover when determining that the pitch angle is within a preset range; or the terminal 202 sends the pitch angle to the currently-accessed satellite base station 201, and the satellite base station 201 notifies the terminal to perform the inter-satellite handover when determining that the pitch angle is within a preset range. Here, the satellite base station refers to: 1. when the low-orbit satellite only supports the transparent forwarding mode, the satellite base station refers to a device collection having capabilities of the base station by combining the low-orbit satellite and the ground gateway; 2. when the low-orbit satellite has the processing capability of the base station, the satellite base station refers to the low-orbit satellite; 3. when the low-orbit satellite supports a part of the processing capability of the base station, the satellite base station refers to a device collection having capabilities of the base station by combining the low-orbit satellite and others.

In embodiments of the disclosure, the terminal or the satellite base station may determine whether to perform a handover of the accessed satellite base station according to the pitch angle and the preset range, while the pitch angle parameter is easy to obtain without additional calculation of other reference information. This can be realized on the basis of normal operations of the current satellite and terminal, and the system implementation is simple; and the occasion when the terminal needs to perform the satellite base station handover can be accurately determined according to the preset range, to realize the fast and accurate satellite base station handover and improving the decision efficiency of the satellite base station handover.

Two handover methods for a satellite base station will be further illustrated below respectively.

Method 1: the terminal performs the inter-satellite handover when determining that the pitch angle is within a preset range.

Figure 3:
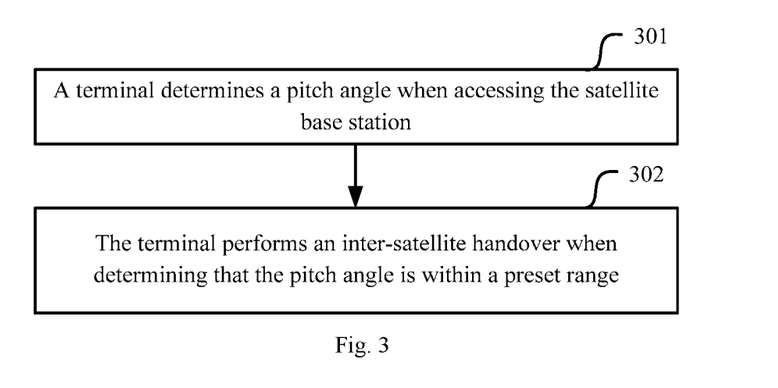
FIG. 3 is a flowchart of a first handover method for a satellite base station according to an embodiment of the disclosure.

A first handover method for a satellite base station provided by an embodiment of the disclosure, as shown in FIG. 3, includes following steps.

Step 301: a terminal determines a pitch angle when accessing the satellite base station.

Step 302: the terminal performs an inter-satellite handover when determining that the pitch angle is within a preset range.

In a possible embodiment, the terminal determines the pitch angle when accessing the satellite base station in following ways.

In a first way, the terminal takes a measured included angle between a beam direction used when an antenna works and a ground horizontal line as the pitch angle.

In a specific implementation, the terminal measures the included angle between the beam direction used when the current antenna works and the ground horizontal line according to the beam direction used when the current antenna works, and takes the measured included angle as the pitch angle.

Figure 4:
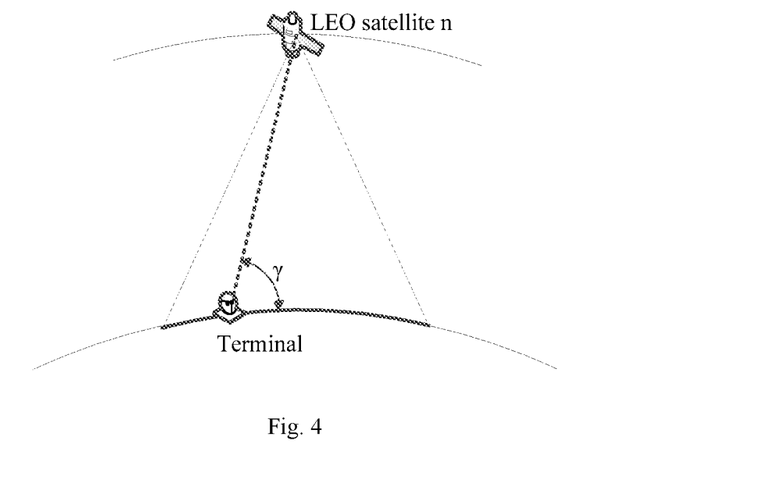
FIG. 4 is a schematic diagram of a pitch angle according to an embodiment of the disclosure.

For example, as shown in FIG. 4, the included angle between the beam direction used when the current terminal antenna works and the ground horizontal line is γ, and the included angle γ is taken as the pitch angle.

In a second way, the terminal receives indication information sent by the accessed satellite base station, and determines the pitch angle according to the indication information.

In a specific implementation, one embodiment is: the terminal receives the indication information sent by the currently-accessed satellite base station, and the indication information may include the pitch angle; and the terminal directly reads the pitch angle included in the indication information after receiving the indication information sent by the satellite base station.

Another embodiment is: after receiving the indication information sent by the currently-accessed satellite base station, the terminal reads the pitch angle included in the indication information, performs local fitting on the pitch angle according to an operating state of the terminal, corrects the pitch angle, and takes the corrected pitch angle as the pitch angle when the terminal accesses the satellite base station.

After determining the pitch angle when accessing the satellite base station, the terminal determines whether the pitch angle is within the preset range. If it is determined that the pitch angle is within the preset range, the terminal performs the inter-satellite handover.

In a possible embodiment, the preset range includes an upper limit and a lower limit. The upper limit of the preset range is a pre-measured included angle between a straight line where the terminal and an adjacent base station corresponding to an overlapping coverage area are located when the terminal leaves the overlapping coverage area and a ground horizontal line. The lower limit of the preset range is a pre-measured included angle between a straight line where the terminal and the adjacent base station corresponding to the overlapping coverage area are located when the terminal enters the overlapping coverage area and the ground horizontal line. The overlapping coverage area is a cross-coverage area between the satellite base station accessed by the terminal and the adjacent base station.

Figure 5:
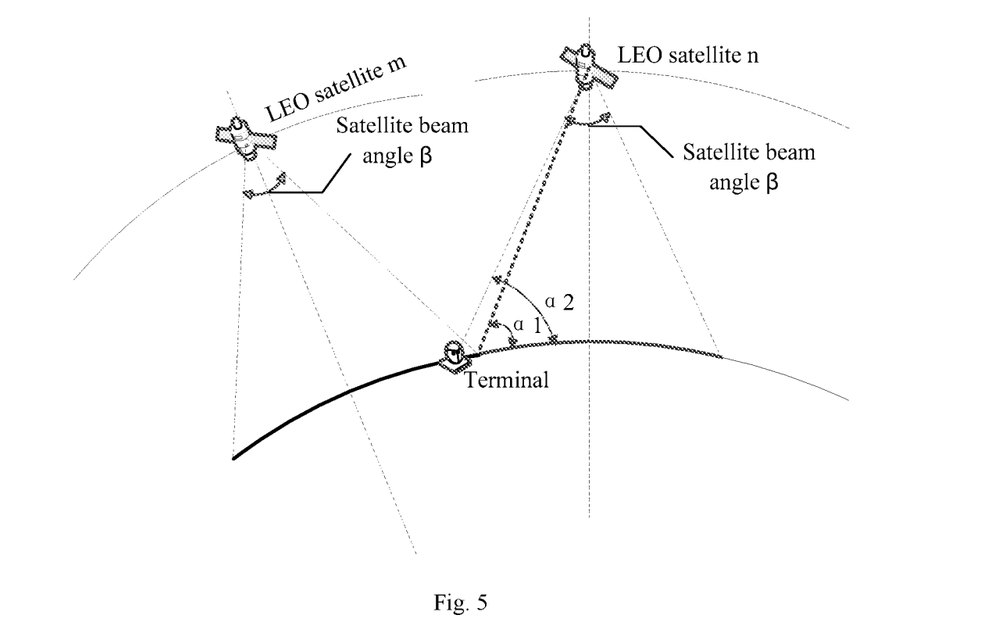
FIG. 5 is a schematic diagram of a first handover process of a satellite base station according to an embodiment of the disclosure.

For example, as shown in FIG. 5, in the case of normal coverage of the LEO satellite, the satellite beam is perpendicular to the ground, the beam angle corresponding to the range that the satellite can cover is β, and adjacent satellites are overlapped to achieve seamless global coverage. Assuming that the satellite base station currently accessed by the terminal is the LEO satellite m, the LEO satellite m and the LEO satellite n are adjacent satellite base stations, and the overlapping coverage area is the cross-coverage area between the LEO satellite m and the LEO satellite n, then the adjacent base station corresponding to the overlapping coverage area is the LEO satellite n. When the pitch angle of the terminal when accessing the satellite base station is within the preset range (that is, when the terminal is in the overlapping coverage area between the LEO satellite m and the LEO satellite n), the terminal needs to switch from the currently-accessed LEO satellite m to the LEO satellite n.

The upper limit of the preset range is a pre-measured included angle between a straight line where the terminal and the adjacent base station corresponding to the overlapping coverage area are located when the terminal leaves the overlapping coverage area and the ground horizontal line, and the angle α1 shown in FIG. 5; and the lower limit of the preset range is a pre-measured included angle between a straight line where the terminal and the adjacent base station corresponding to the overlapping coverage area are located when the terminal enters the overlapping coverage area and the ground horizontal line, and the angle α2 shown in FIG. 5.

In a possible embodiment, the terminal performs the inter-satellite handover when determining that the pitch angle is within the preset range.

The terminal sends a handover request message to the currently-accessed satellite base station. After receiving the handover request message, the currently-accessed satellite base station determines that the terminal needs to perform the inter-satellite handover and then returns a handover response message to the terminal. The handover response message includes information of a target satellite base station to which the terminal needs to hand over.

After determining that the terminal needs to perform the inter-satellite handover, the currently-accessed satellite base station also needs to notify the target base station that the terminal needs to hand over to the target satellite base station.

After receiving the handover response message returned by the currently-accessed satellite base station, the terminal determines the target satellite base station to be handed over to according to the information in the handover response message, and initiates access to the target satellite base station. After the terminal successfully accesses the target satellite, the inter-satellite handover process is completed.

For example, assuming that the preset range is 50 degrees to 60 degrees, if the terminal determines that the pitch angle when accessing the satellite base station is 55 degrees, then the terminal performs the inter-satellite handover; if the terminal determines that the pitch angle when currently accessing the satellite base station is 75 degrees, then the terminal can work normally in the currently-accessed satellite base station, and does not need to perform the handover of the satellite base station.

In another possible embodiment, the terminal may also determine whether to perform the inter-satellite handover according to the pitch angle and RSSI (Received Signal Strength Indicator) information of the currently-accessed satellite base station and the adjacent satellite base station obtained through RRM (Radio Resource Management) measurement, and the RSSI information includes the signal received power.

The terminal performs the inter-satellite handover when determining that the pitch angle is within the preset range and the signal received power of the adjacent satellite base station is not less than that of the accessed satellite base station.

In a possible embodiment, the terminal determines that a duration between time when a previous inter-satellite handover was performed and current time reaches a preset handover maintenance duration before determining the pitch angle when accessing the satellite base station.

In a specific implementation, the terminal does not perform the handover judgment process of the satellite base station within the preset handover maintenance duration, to prevent the terminal from making an erroneous handover judgment when the pitch angle is still in the preset range after the handover of the satellite base station is completed.

In a possible embodiment, the terminal periodically determines the pitch angle when accessing the satellite base station, to periodically determine whether to perform the handover of the satellite base station.

If the terminal determines that the terminal does not need to perform the inter-satellite handover in this cycle, the terminal further needs to determine the pitch angle when accessing the satellite base station again in the next cycle, and determine whether the pitch angle is within the preset range.

Figure 6:
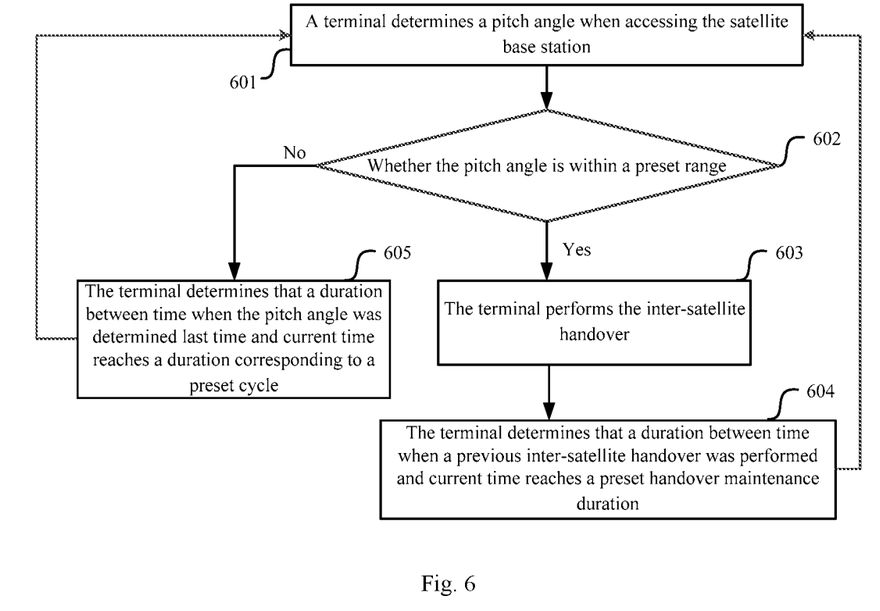
FIG. 6 is a complete flowchart of a first handover method for a satellite base station according to an embodiment of the disclosure.

As shown in FIG. 6, FIG. 6 is a complete flowchart of a first handover method for a satellite base station according to an embodiment of the disclosure, including following steps.

Step 601: a terminal determines a pitch angle when accessing the satellite base station.

Step 602: the terminal determines whether the pitch angle is within a preset range; if the pitch angle is within the preset range, executes step 603; if the pitch angle is not within the preset range, executes step 604.

Step 603: the terminal performs the inter-satellite handover.

Step 604: the terminal returns to step 601 after determining that a duration between time when a previous inter-satellite handover was performed and current time reaches a preset handover maintenance duration.

Step 605: the terminal returns to step 601 after determining that a duration between time when the pitch angle was determined last time and current time reaches a duration corresponding to a preset cycle.

Here, the preset cycle is a preset cycle during which the terminal periodically determines the pitch angle when accessing the satellite base station.

Figure 7:
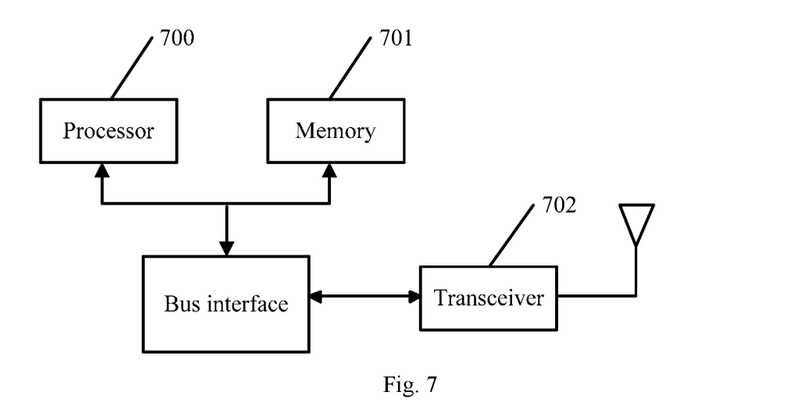
FIG. 7 is a structural schematic diagram of a first terminal according to an embodiment of the disclosure.

As shown in FIG. 7, a first terminal used in the handover method for the satellite base station in an embodiment of the disclosure includes: a processor 700, a memory 701, a transceiver 702 and a bus interface.

The processor 700 is responsible for managing the bus architecture and general processing, and the memory 701 may store data used by the processor 700 when performing operations. The transceiver 702 is configured to receive and send data under control of the processor 700.

The bus architecture may include any numbers of interconnected buses and bridges, and link various circuits of one or more processors represented by the processor 700 and the memory represented by the memory 701. The bus architecture may further link various other circuits and a peripheral device, a voltage regulator and a power management circuit, which are all well known in the art and thus will not be further described again herein. The bus interface provides an interface. The processor 700 is responsible for managing the bus architecture and general processing, and the memory 701 may store data used by the processor 700 when performing operations.

The procedure disclosed by an embodiment of the disclosure may be applied in the processor 700 or implemented by the processor 700. In an implementation process, each step of the signal processing flow may be completed by the integrated logic circuit of hardware in the processor 700 or instructions in form of software. The processor 700 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the disclosure. The general-purpose processor may be a microprocessor or any conventional processor or the like. The steps of the method disclosed in combination with embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 701, and the processor 700 reads information in the memory 701 and completes steps of the signal processing flow in combination with the hardware of the processor 700.

The processor 700 is configured to read the program in the memory 701 to: determine a pitch angle when accessing a satellite base station; perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the processor 700 is configured to: take a measured included angle between a beam direction used when an antenna works and a ground horizontal line as the pitch angle; or receive indication information sent by the accessed satellite base station, and determine the pitch angle according to the indication information.

In one embodiment, the processor 700 is further configured to: determine that a duration between time when a previous inter-satellite handover was performed and current time reaches a preset handover maintenance duration before determining the pitch angle when accessing the satellite base station.

Figure 8:
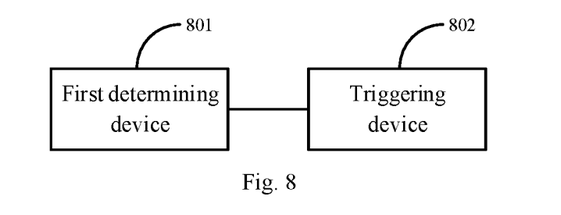
FIG. 8 is a schematic diagram of an apparatus structure of a first terminal according to an embodiment of the disclosure.

As shown in FIG. 8, a first terminal according to an embodiment of the disclosure includes: a first determining device 801 configured to determine a pitch angle when accessing a satellite base station; a triggering device 802 configured to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the first determining device 801 is configured to: take a measured included angle between a beam direction used when an antenna works and a ground horizontal line as the pitch angle; or receive indication information sent by the accessed satellite base station, and determine the pitch angle according to the indication information.

In one embodiment, the first determining device 801 is further configured to: determine that a duration between time when a previous inter-satellite handover was performed and current time reaches a preset handover maintenance duration before determining the pitch angle when accessing the satellite base station.

An embodiment of the disclosure further provides a storage medium storing a processor-readable program thereon, where the program implements steps of the above-mentioned handover method for the satellite base station when executed by a processor.

Method 2: the satellite base station notifies the terminal to perform the inter-satellite handover when determining that the pitch angle is within a preset range.

The handover system for the satellite base station as shown in FIG. 2 includes a satellite base station 201 and a terminal 202.

The satellite base station 201 is configured to: receive a pitch angle sent by the terminal; and notify the terminal to perform an inter-satellite handover when determining that the pitch angle is within a preset range.

The terminal 202 is configured to: determine the pitch angle when accessing the satellite base station; and send the pitch angle to the accessed satellite base station, and the satellite base station notifies the terminal to perform the inter-satellite handover when determining that the pitch angle is within the preset range.

In a possible embodiment, the terminal determines the pitch angle when accessing the satellite base station in following ways.

In a first way, the terminal takes a measured included angle between a beam direction used when an antenna works and a ground horizontal line as the pitch angle.

In a specific implementation, the terminal measures the included angle between the beam direction used when the current antenna works and the ground horizontal line according to the beam direction used when the current antenna works, and takes the measured included angle as the pitch angle.

In a second way, the terminal receives the indication information sent by the accessed satellite base station, and determines the pitch angle according to the indication information.

In a specific implementation, one embodiment is: the terminal receives the indication information sent by the currently-accessed satellite base station, and the indication information may include the pitch angle, and the terminal directly reads the pitch angle included in the indication information after receiving the indication information sent by the satellite base station.

Another embodiment is: after receiving the indication information sent by the currently-accessed satellite base station, the terminal reads the pitch angle included in the indication information, performs local fitting on the pitch angle according to the operating state of the terminal, corrects the pitch angle, and takes the corrected pitch angle as the pitch angle when the terminal accesses the satellite base station.

After determining the pitch angle when accessing the satellite base station, the terminal sends the pitch angle to the accessed satellite base station.

In a possible embodiment, after receiving the pitch angle, the satellite base station determines whether the pitch angle is within a preset range, and notifies the terminal to perform the inter-satellite handover when determining that the pitch angle is within the preset range.

It should be noted that the preset range includes an upper limit and a lower limit. The upper limit of the preset range is a pre-measured included angle between a straight line where the terminal and an adjacent base station corresponding to an overlapping coverage area are located when the terminal leaves the overlapping coverage area and a ground horizontal line. The lower limit of the preset range is a pre-measured included angle between a straight line where the terminal and the adjacent base station corresponding to the overlapping coverage area are located when the terminal enters the overlapping coverage area and the ground horizontal line. The overlapping coverage area is a cross-coverage area between the satellite base station accessed by the terminal and the adjacent base station.

Figure 9:
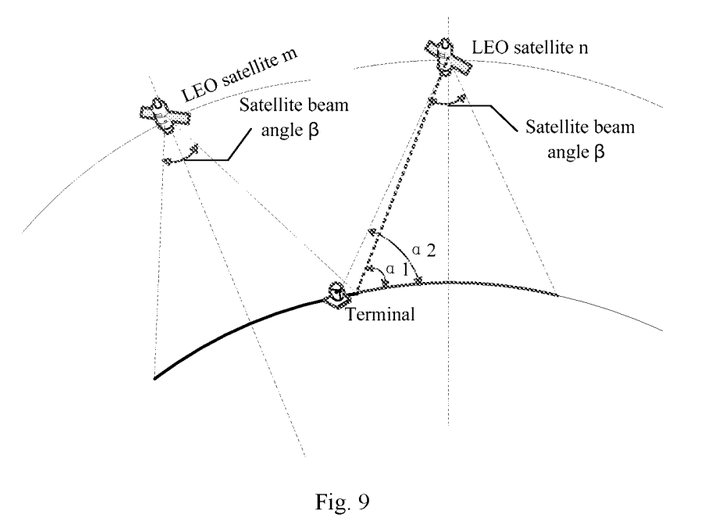
FIG. 9 is a schematic diagram of a second handover process of a satellite base station according to an embodiment of the disclosure.

For example, as shown in FIG. 9, in the case of normal coverage of the LEO satellite, the satellite beam is perpendicular to the ground, the beam angle corresponding to the range that the satellite can cover is β, and adjacent satellites are overlapped to achieve the seamless global coverage. Assuming that the satellite base station currently accessed by the terminal is the LEO satellite m, the LEO satellite m and the LEO satellite n are adjacent satellite base stations, and the overlapping coverage area is the cross-coverage area between the LEO satellite m and the LEO satellite n, then the adjacent base station corresponding to the overlapping coverage area is the LEO satellite n. When the pitch angle of the terminal when accessing the satellite base station is within the preset range (that is, when the terminal is in the overlapping coverage area between the LEO satellite m and the LEO satellite n), the terminal needs to switch from the currently-accessed LEO satellite m to the LEO satellite n.

The upper limit of the preset range is a pre-measured included angle between a straight line where the terminal and the adjacent base station corresponding to the overlapping coverage area are located when the terminal leaves the overlapping coverage area and the ground horizontal line, and the angle α1 shown in FIG. 9; and the lower limit of the preset range is a pre-measured included angle between a straight line where the terminal and the adjacent base station corresponding to the overlapping coverage area are located when the terminal enters the overlapping coverage area and the ground horizontal line, and the angle α2 shown in FIG. 9.

In a specific implementation, the terminal may send the pitch angle to the accessed satellite base station in following ways.

The terminal sends the pitch angle to the accessed satellite base station through RRC (Radio Resource Control) signaling.

In an implementation, reporting information of a terminal antenna state is added to the RRC signaling, information of a terminal working state is carried in the signaling, and the information of the terminal working state includes the pitch angle.

Furthermore, the terminal may also send the pitch angle and the RSSI (Received Signal Strength Indicator) information of the currently-accessed satellite base station and the adjacent satellite base station obtained through RRM (Radio Resource Management) measurement to the accessed satellite base station. After receiving the pitch angle and RSSI information, the satellite base station determines whether to notify the terminal to trigger the handover of the satellite base station based on the pitch angle and the received signal power.

The satellite base station notifies the terminal to trigger the handover of the satellite base station when determining that the pitch angle is within the preset range and the signal received power of the adjacent satellite base station is not less than that of the accessed satellite base station.

In a possible embodiment, the terminal sends the pitch angle to the accessed satellite base station in following ways.

In a first way: sending the pitch angle through RRC signaling for reporting RRM measurement information.

The current 5G protocol stipulates that the terminal may send the RRM measurement information to the network side after starting to perform the RRM measurement; the terminal may put the pitch angle in the RRM measurement information for reporting the RSSI information, and send the pitch angle and the RSSI information to the accessed satellite base station simultaneously.

In a second way: sending the pitch angle through a newly-added dedicated RRC signaling indication.

The terminal adds the dedicated RRC signaling, and sends the information of the terminal working state through the newly-added RRC signaling, where the information of the terminal working state includes the pitch angle. The pitch angle is sent to the accessed satellite base station by using the dedicated RRC signaling indication; and the RSSI information is sent to the accessed satellite base station through the existing RRC signaling for reporting the RRM measurement information.

In a possible embodiment, after the terminal receives a message notifying the terminal to perform the inter-satellite handover sent by the satellite base station, the terminal sends a handover request message to the currently-accessed satellite base station. After receiving the handover request message, the currently-accessed satellite base station determines that the terminal needs to perform the inter-satellite handover and then returns a handover response message to the terminal, where the handover response message includes information of a target satellite base station to which the terminal needs to hand over.

After determining that the terminal needs to perform the inter-satellite handover, the currently-accessed satellite base station also needs to notify the target base station that the terminal needs to hand over to the target satellite base station.

After receiving the handover response message returned by the currently-accessed satellite base station, the terminal determines the target satellite base station to be handed over to according to the information in the handover response message, and initiates access to the target satellite base station. After the terminal successfully accesses the target satellite, the inter-satellite handover process is completed.

In a possible embodiment, the terminal determines that the a duration between time when a previous inter-satellite handover was performed and current time reaches a preset handover maintenance duration before determining the pitch angle when accessing the satellite base station.

In a specific implementation, the terminal does not perform the handover judgment process of the satellite base station within the preset handover maintenance duration, to prevent the terminal from making an erroneous handover judgment when the pitch angle is still in the preset range after the handover of the satellite base station is completed.

Figure 10:
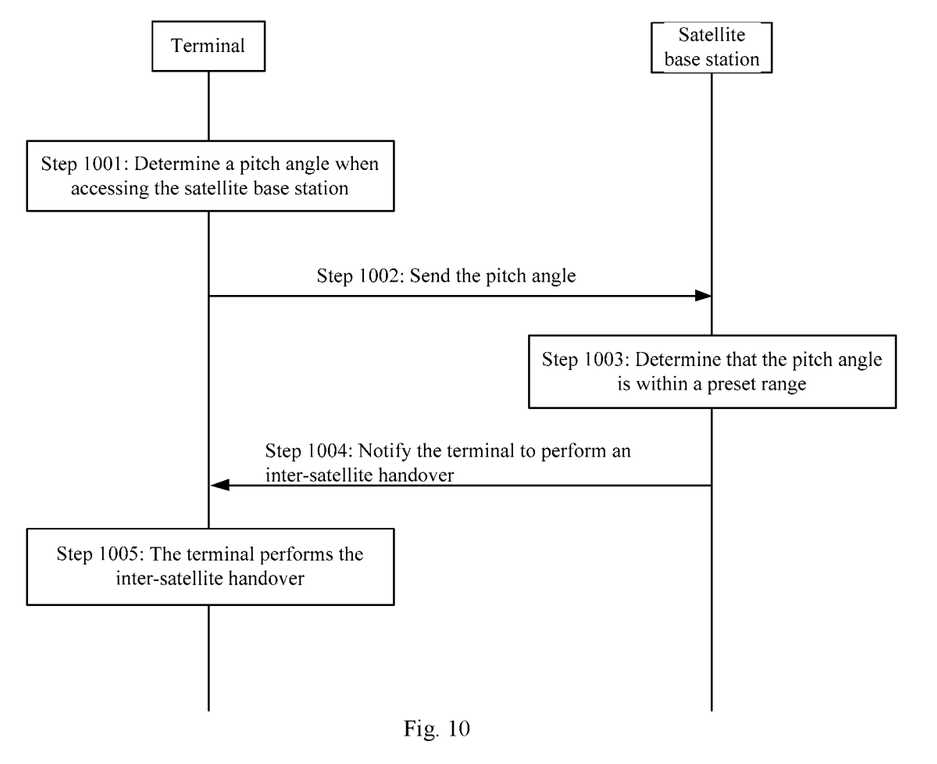
FIG. 10 is a complete flowchart of a second handover method for a satellite base station according to an embodiment of the disclosure.

As shown in FIG. 10, FIG. 10 is a complete flowchart of a second handover method for a satellite base station according to an embodiment of the disclosure, including following steps.

Step 1001: a terminal determines a pitch angle when accessing the satellite base station.

Step 1002: the terminal sends the pitch angle to the accessed satellite base station.

Step 1003: the satellite base station determines that the pitch angle is within a preset range.

Step 1004: the satellite base station notifies the terminal to perform an inter-satellite handover.

Step 1005: the terminal performs the inter-satellite handover.

Based on the same inventive concept, an embodiment of the disclosure further provides a terminal. Since the principle of the terminal to solve the problem is similar to the handover method for a satellite base station in an embodiment of the disclosure, implementations of the terminal can refer to implementations of the method, and the repeated description thereof will be omitted here.

Figure 11:
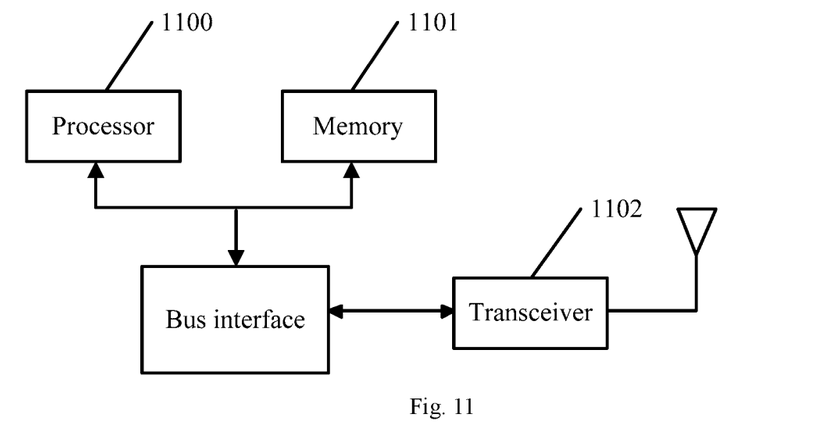
FIG. 11 is a structural schematic diagram of a second terminal according to an embodiment of the disclosure.

As shown in FIG. 11, a second terminal used in the handover method for a satellite base station in an embodiment of the disclosure includes: a processor 1100, a memory 1101, a transceiver 1102 and a bus interface.

The processor 1100 is responsible for managing the bus architecture and general processing, and the memory 1101 may store data used by the processor 1100 when performing operations. The transceiver 1102 is configured to receive and send data under control of the processor 1100.

The bus architecture may include any numbers of interconnected buses and bridges, and link various circuits of one or more processors represented by the processor 1100 and the memory represented by the memory 1101. The bus architecture may further link various other circuits and a peripheral device, a voltage regulator and a power management circuit, which are all well known in the art and thus will not be further described again herein. The bus interface provides an interface. The processor 1100 is responsible for managing the bus architecture and general processing, and the memory 1101 may store the data used by the processor 1100 when performing the operations.

The procedure disclosed by an embodiment of the disclosure may be applied in the processor 1100 or implemented by the processor 1100. In an implementation process, each step of the signal processing flow may be completed by an integrated logic circuit of hardware in the processor 1100 or instructions in form of software. The processor 1100 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the disclosure. The general-purpose processor may be a microprocessor or any conventional processor or the like. The steps of the method disclosed in combination with embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1101, and the processor 1100 reads the information in the memory 1101 and completes the steps of the signal processing flow in combination with the hardware of the processor 1100.

The processor 1100 is configured to read the program in the memory 1101 to: determine a pitch angle when accessing a satellite base station; send the pitch angle to the accessed satellite base station, and the satellite base station notifies the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the processor 1100 is configured to: take a measured included angle between a beam direction used when an antenna works and a ground horizontal line as the pitch angle; or receive indication information sent by the accessed satellite base station, and determine the pitch angle according to the indication information.

In one embodiment, the processor 1100 is further configured to: determine that a duration between time when a previous inter-satellite handover was performed and current time reaches a preset handover maintenance duration before determining the pitch angle when accessing the satellite base station.

Figure 12:
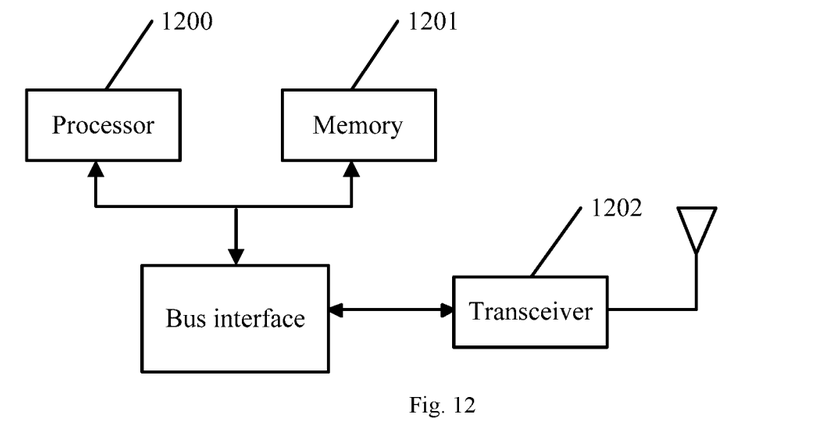
FIG. 12 is a structural schematic diagram of a satellite base station according to an embodiment of the disclosure.

As shown in FIG. 12, a satellite base station in an embodiment of the disclosure includes: a processor 1200, a memory 1201, a transceiver 1202 and a bus interface.

The processor 1200 is responsible for managing the bus architecture and general processing, and the memory 1201 may store the data used by the processor 1200 when performing the operations. The transceiver 1202 is configured to receive and send the data under the control of the processor 1200.

The bus architecture may include any numbers of interconnected buses and bridges, and link various circuits of one or more processors represented by the processor 1200 and the memory represented by the memory 1201. The bus architecture may further link various other circuits and peripheral device, voltage regulator and power management circuit, which are all well known in the art and thus will not be further described again herein. The bus interface provides an interface. The processor 1200 is responsible for managing the bus architecture and general processing, and the memory 1201 may store the data used by the processor 1200 when performing the operations.

The procedure disclosed by an embodiment of the disclosure may be applied in the processor 1200 or implemented by the processor 1200. In an implementation process, each step of the signal processing flow may be completed by an integrated logic circuit of hardware in the processor 1200 or instructions in form of software. The processor 1200 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the disclosure. The general-purpose processor may be a microprocessor or any conventional processor or the like. The steps of the method disclosed in combination with embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1201, and the processor 1200 reads the information in the memory 1201 and completes the steps of the signal processing flow in combination with the hardware of the processor 1200.

The processor 1200 is configured to read the program in the memory 1201 to: receive a pitch angle sent by a terminal; where the pitch angle is a pitch angle when the terminal accesses the satellite base station; notify the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the processor 1200 is further configured to: send indication information to the terminal, and the terminal determines the pitch angle according to the indication information.

Figure 13:
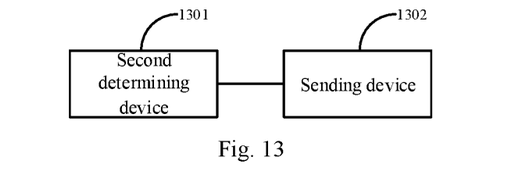
FIG. 13 is a schematic diagram of an apparatus structure of a second terminal according to an embodiment of the disclosure.

As shown in FIG. 13, a second terminal according to an embodiment of the disclosure includes: a second determining device 1301 configured to determine a pitch angle when accessing a satellite base station; a sending device 1302 configured to send the pitch angle to the accessed satellite base station, and the satellite base station notifies the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the second determining device 1301 is configured to: take a measured included angle between a beam direction used when an antenna works and a ground horizontal line as the pitch angle; or receive indication information sent by the accessed satellite base station, and determine the pitch angle according to the indication information.

In one embodiment, the second determining device 1301 is further configured to: determine that a duration between time when a previous inter-satellite handover was performed and current time reaches a preset handover maintenance duration before determining the pitch angle when accessing the satellite base station.

Figure 14:
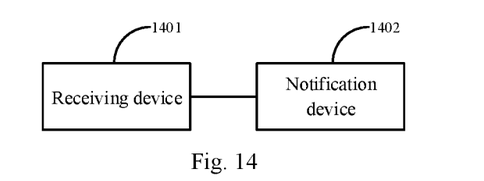
FIG. 14 is a schematic diagram of an apparatus structure of a satellite base station according to an embodiment of the disclosure.

As shown in FIG. 14, a satellite base station according to an embodiment of the disclosure includes: a receiving device 1401 configured to receive a pitch angle sent by a terminal; where the pitch angle is a pitch angle when the terminal accesses the satellite base station; a notification device 1402 configured to notify the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the notification device 1402 is further configured to: send indication information to the terminal, and the terminal determines the pitch angle according to the indication information.

An embodiment of the disclosure further provide a storage medium storing a processor-readable program thereon, where the program implements steps of the above-mentioned handover method for the satellite base station when executed by a processor.

Based on the same inventive concept, an embodiment of the disclosure provides a handover method for a satellite base station. Since this method corresponds to the second terminal in the handover system for the satellite base station in embodiments of the disclosure and the principle of the method to solve the problem is similar to that of the system, the implementations of this method can refer to the implementations of the system, and the repeated description thereof will be omitted here.

Figure 15:
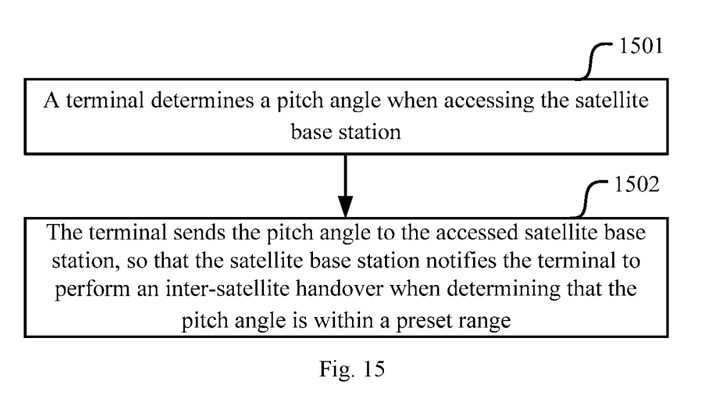
FIG. 15 is a flowchart of a second handover method for a satellite base station according to an embodiment of the disclosure.

As shown in FIG. 15, a handover method for a satellite base station according to an embodiment of the disclosure includes following steps.

Step 1501: a terminal determines a pitch angle when accessing the satellite base station.

Step 1502: the terminal sends the pitch angle to the accessed satellite base station, and the satellite base station notifies the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, the step in which the terminal determines the pitch angle when accessing the satellite base station, includes: the terminal takes a measured included angle between a beam direction used when an antenna works and a ground horizontal line as the pitch angle; or the terminal receives indication information sent by the accessed satellite base station, and determines the pitch angle according to the indication information.

In one embodiment, before the terminal determines the pitch angle when accessing the satellite base station, the method further includes: the terminal determines that a duration between time when a previous inter-satellite handover was performed and current time reaches a preset handover maintenance duration.

Based on the same inventive concept, an embodiment of the disclosure provides a handover method for a satellite base station. Since this method corresponds to the satellite base station in the handover system for the satellite base station in embodiments of the disclosure and the principle of the method to solve the problem is similar to that of the system, the implementations of this method can refer to the implementations of the system, and the repeated description thereof will be omitted here.

Figure 16:
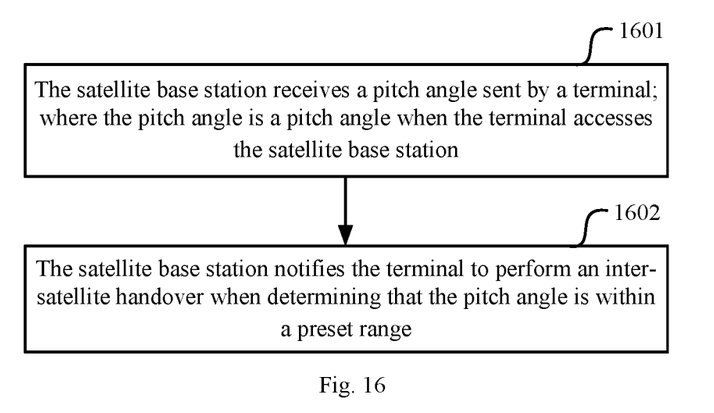
FIG. 16 is a flowchart of a handover method for a satellite base station applied to the satellite base station according to an embodiment of the disclosure.

As shown in FIG. 16, a handover method for a satellite base station according to an embodiment of the disclosure includes following steps.

Step 1601: the satellite base station receives a pitch angle sent by a terminal; where the pitch angle is a pitch angle when the terminal accesses the satellite base station.

Step 1602: the satellite base station notifies the terminal to perform an inter-satellite handover when determining that the pitch angle is within a preset range.

In one embodiment, an upper limit of the preset range is a pre-measured included angle between a straight line where the terminal and an adjacent base station corresponding to an overlapping coverage area are located when the terminal leaves the overlapping coverage area and a ground horizontal line; a lower limit of the preset range is a pre-measured included angle between a straight line where the terminal and the adjacent base station corresponding to the overlapping coverage area are located when the terminal enters the overlapping coverage area and the ground horizontal line; where the overlapping coverage area is a cross-coverage area between the satellite base station accessed by the terminal and the adjacent base station.

In one embodiment, before the satellite base station receives the pitch angle sent by the accessed terminal, the method further includes: the satellite base station sends indication information to the terminal, and the terminal determines the pitch angle according to the indication information.

Embodiments of the disclosure can be provided as methods, systems and computer program products. Thus, the disclosure can take the form of hardware embodiments alone, software embodiments alone, or embodiments combining the software and hardware aspects. Also, the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which may guide the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A handover method for a satellite base station, the method comprising:
   determining, by a terminal, a pitch angle when accessing the satellite base station;
   performing, by the terminal, an inter-satellite handover when determining that the pitch angle is within a preset range; or sending, by the terminal, the pitch angle to the accessed satellite base station, so that the satellite base station notifies the terminal to perform the inter-satellite handover when determining that the pitch angle is within the preset range;

wherein an upper limit of the preset range is a pre-measured included angle between a straight line where the terminal and an adjacent base station corresponding to an overlapping coverage area are located when the terminal leaves the overlapping coverage area and a ground horizontal line;

a lower limit of the preset range is a pre-measured included angle between a straight line where the terminal and the adjacent base station corresponding to the overlapping coverage area are located when the terminal enters the overlapping coverage area and the ground horizontal line;

wherein the overlapping coverage area is a cross-coverage area between the satellite base station accessed by the terminal and the adjacent base station.

2. The method according to claim 1, wherein determining, by the terminal, the pitch angle when accessing the satellite base station, comprises:

taking, by the terminal, a measured included angle between a beam direction used when an antenna works and a ground horizontal line as the pitch angle; or receiving, by the terminal, indication information sent by the accessed satellite base station, and determining the pitch angle according to the indication information.

3. The method according to claim 1, wherein before the terminal determines the pitch angle when accessing the satellite base station, the method further comprises:

determining, by the terminal, that a duration between time when a previous inter-satellite handover was performed and current time reaches a preset handover maintenance duration.

4. A handover method for a satellite base station, the method comprising:

receiving, by the satellite base station, a pitch angle sent by a terminal; wherein the pitch angle is a pitch angle when the terminal accesses the satellite base station;

notifying, by the satellite base station, the terminal to perform an inter-satellite handover when determining that the pitch angle is within a preset range;

wherein an upper limit of the preset range is a pre-measured included angle between a straight line where the terminal and an adjacent base station corresponding to an overlapping coverage area are located when the terminal leaves the overlapping coverage area and a ground horizontal line;

a lower limit of the preset range is a pre-measured included angle between a straight line where the terminal and the adjacent base station corresponding to the overlapping coverage area are located when the terminal enters the overlapping coverage area and the ground horizontal line;

wherein the overlapping coverage area is a cross-coverage area between the satellite base station accessed by the terminal and the adjacent base station.

5. The method according to claim 4, wherein before the satellite base station receives the pitch angle sent by the accessed terminal, the method further comprises:

sending, by the satellite base station, indication information to the terminal, so that the terminal determines the pitch angle according to the indication information.

6. A terminal, the terminal comprising a processor, a memory and a transceiver;

wherein the processor is configured to read programs in the memory to:

determine a pitch angle when accessing a satellite base station;

perform an inter-satellite handover when determining that the pitch angle is within a preset range; or send the pitch angle to the accessed satellite base station, so that the satellite base station notifies the terminal to perform the inter-satellite handover when determining that the pitch angle is within the preset range;

wherein an upper limit of the preset range is a pre-measured included angle between a straight line where the terminal and an adjacent base station corresponding to an overlapping coverage area are located when the terminal leaves the overlapping coverage area and a ground horizontal line;

a lower limit of the preset range is a pre-measured included angle between a straight line where the terminal and the adjacent base station corresponding to the overlapping coverage area are located when the terminal enters the overlapping coverage area and the ground horizontal line;

wherein the overlapping coverage area is a cross-coverage area between the satellite base station accessed by the terminal and the adjacent base station.

7. The terminal according to claim 6, wherein the processor is configured to:

take a measured included angle between a beam direction used when an antenna works and a ground horizontal line as the pitch angle; or receive indication information sent by the accessed satellite base station, and determine the pitch angle according to the indication information.

8. The terminal according to claim 6, wherein the processor is further configured to:

determine that a duration between time when a previous inter-satellite handover was performed and current time reaches a preset handover maintenance duration before determining the pitch angle when accessing the satellite base station.

* * * * *